US012451133B2

(12) United States Patent
Sumpter et al.

(10) Patent No.: US 12,451,133 B2
(45) Date of Patent: Oct. 21, 2025

(54) VOICE-BASED MENU PERSONALIZATION

(71) Applicant: NCR Voyix Corporation, Atlanta, GA (US)

(72) Inventors: Jodessiah Sumpter, Alpharetta, GA (US); Christian McDaniel, Atlanta, GA (US); Kendall Marie Rose, Canton, MI (US); Shaundell D. Thompson, Loganville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 0 days.

(21) Appl. No.: 18/125,443

(22) Filed: Mar. 23, 2023

(65) Prior Publication Data

US 2023/0230590 A1  Jul. 20, 2023

Related U.S. Application Data

(63) Continuation of application No. 17/105,159, filed on Nov. 25, 2020, now Pat. No. 11,676,592.

(51) Int. Cl.
*G10L 15/22* (2006.01)
*G10L 15/26* (2006.01)
*G06Q 30/0601* (2023.01)
*G06Q 50/12* (2012.01)

(52) U.S. Cl.
CPC ............. *G10L 15/22* (2013.01); *G10L 15/26* (2013.01); *G06Q 30/0635* (2013.01); *G06Q 50/12* (2013.01); *G10L 2015/227* (2013.01)

(58) Field of Classification Search
CPC ...................................................... G10L 15/22
See application file for complete search history.

(56) References Cited

U.S. PATENT DOCUMENTS

| 6,212,498 B1* | 4/2001 | Sherwood | G10L 15/063 |
| | | | 704/235 |
| 9,741,337 B1* | 8/2017 | Shastry | G10L 17/04 |
| 10,977,606 B1* | 4/2021 | Mimassi | G06Q 10/08355 |
| 2003/0120493 A1 | 6/2003 | Gupta | |

(Continued)

OTHER PUBLICATIONS

EP Examination Report Oct. 27, 2023.

(Continued)

*Primary Examiner* — Jialong He
(74) *Attorney, Agent, or Firm* — Schwegman Lundberg & Woessner, P.A.

(57) ABSTRACT

A natural-language voice chatbot engages a consumer in a voice dialogue. The chatbot is customized for engaging the specific consumer based on features and characteristics of that specific consumer's speech and a lexicon associated with terms, words, and commands for item ordering. The consumer can perform voice queries for specific items and/or specific establishments for placing a pre-staged order with the chatbot. Once the consumer selects options with a specific establishment, a pre-staged order is provided to the corresponding establishment on behalf of the user. Location data for a consumer-operated device is monitored and when it is determined that the consumer will arrive at the establishment within a time period required by the establishment to prepare the pre-staged order, a message is sent to the establishment to begin preparing the pre-staged order.

10 Claims, 3 Drawing Sheets

(56) References Cited

U.S. PATENT DOCUMENTS

| | | |
|---|---|---|
| 2011/0295603 A1* | 12/2011 | Meisel .................... G10L 15/32 |
| | | 704/E17.001 |
| 2014/0214465 A1 | 7/2014 | L'heureux et al. |
| 2014/0236598 A1* | 8/2014 | Fructuoso ............... H04M 1/00 |
| | | 704/249 |
| 2014/0370167 A1 | 12/2014 | Garden |
| 2016/0247113 A1 | 8/2016 | Rademaker |
| 2017/0124670 A1 | 5/2017 | Becker et al. |
| 2017/0345105 A1* | 11/2017 | Isaacson ................ G06Q 20/40 |
| 2018/0336904 A1 | 11/2018 | Piercy et al. |
| 2019/0049988 A1 | 2/2019 | Meij |
| 2019/0378495 A1* | 12/2019 | Kim ...................... G10L 15/063 |
| 2020/0143797 A1 | 5/2020 | Manoharan et al. |
| 2020/0311804 A1* | 10/2020 | Buckholdt ......... G06Q 30/0641 |
| 2020/0311840 A1 | 10/2020 | Zuckerman |
| 2020/0395008 A1* | 12/2020 | Cohen .................... G06F 40/268 |
| 2022/0165262 A1 | 5/2022 | Sumpter et al. |
| 2022/0327641 A1* | 10/2022 | Fox .................... G06Q 30/0635 |

OTHER PUBLICATIONS

Shah Khushbu: "New Domino's App Uses Voice Recognition to Let You Order Pizza—Eater",Jun. 17, 2014 (Jun. 17, 2014), pp. 1-3, XP093091507, Retrieved from the Internet: URL:https://www.eater.com/2014/6/17/6206185/new-dominos-app* uses-voice-recognition-to-let-you-order-pizza [retrieved on Oct. 13, 2023].

* cited by examiner

VOICE-BASED MENU PERSONALIZATION

CROSS-REFERENCE TO RELATED APPLICATION

This application is a continuation of U.S. patent application Ser. No. 17/105,159 filed Nov. 25, 2020, which application and publication is incorporated herein by reference in its entirety.

BACKGROUND

The drive-thru experience is becoming more time consuming for most restaurants. The average time in the drive thru is now 255 seconds to fulfill an order which is up 60 secs from the previous year. This increase can be attributed to increased menu options for the customer to review, increased lines due to additional people ordering in vehicle and incorrect order delays once they arrive at the pickup window. This issue often leads to the abandonment of the line or the user choosing to walk into the restaurant instead. Its estimated that $178 million dollars per 2000 stores is loss at the drive thru window annually.

Additionally, the COVID19 pandemic has dramatically increased pickup and drive-thru orders, since many states have banned indoor dining in an effort to slow the spread of the virus. Restaurants are struggling to handle the volume of orders both from drive-thru orders and pickup orders. Restaurants were not equipped from staffing and technology standpoints to move their primary mode of business from indoor dining to drive-thru and pickup.

Given that some restaurants are no longer allowed to accepted diners or can only accept a reduced volume of diners, many restaurants are searching for ways to improve their ability to handle the volume associated with drive-thru and pickup orders. Furthermore, because restaurants have lost all or nearly all indoor diners due to the pandemic, restaurants are also simultaneously searching for ways to increase order volumes associated with drive-thru and pickup orders. Yet, increasing order volume is challenging for these restaurants when existing customer experiences associated with drive-thru orders and pickup orders were unfavorable to the restaurants even before the pandemic hit.

SUMMARY

In various embodiments, methods and a system for voice-based menu personalization are provided.

According to an embodiment, a method for voice-based menu personalization is presented. A voice-based natural language session is established with a user who is operating a user device. The speech of the user is translated into text based on voice characteristics that are specific to the user and specific to a lexicon associated with ordering. An establishment and options selected for a pre-staged order with the establishment are determined from the text. The pre-staged order is placed with the establishment on behalf of the user with the options.

DETAILED DESCRIPTION

Figure 1:
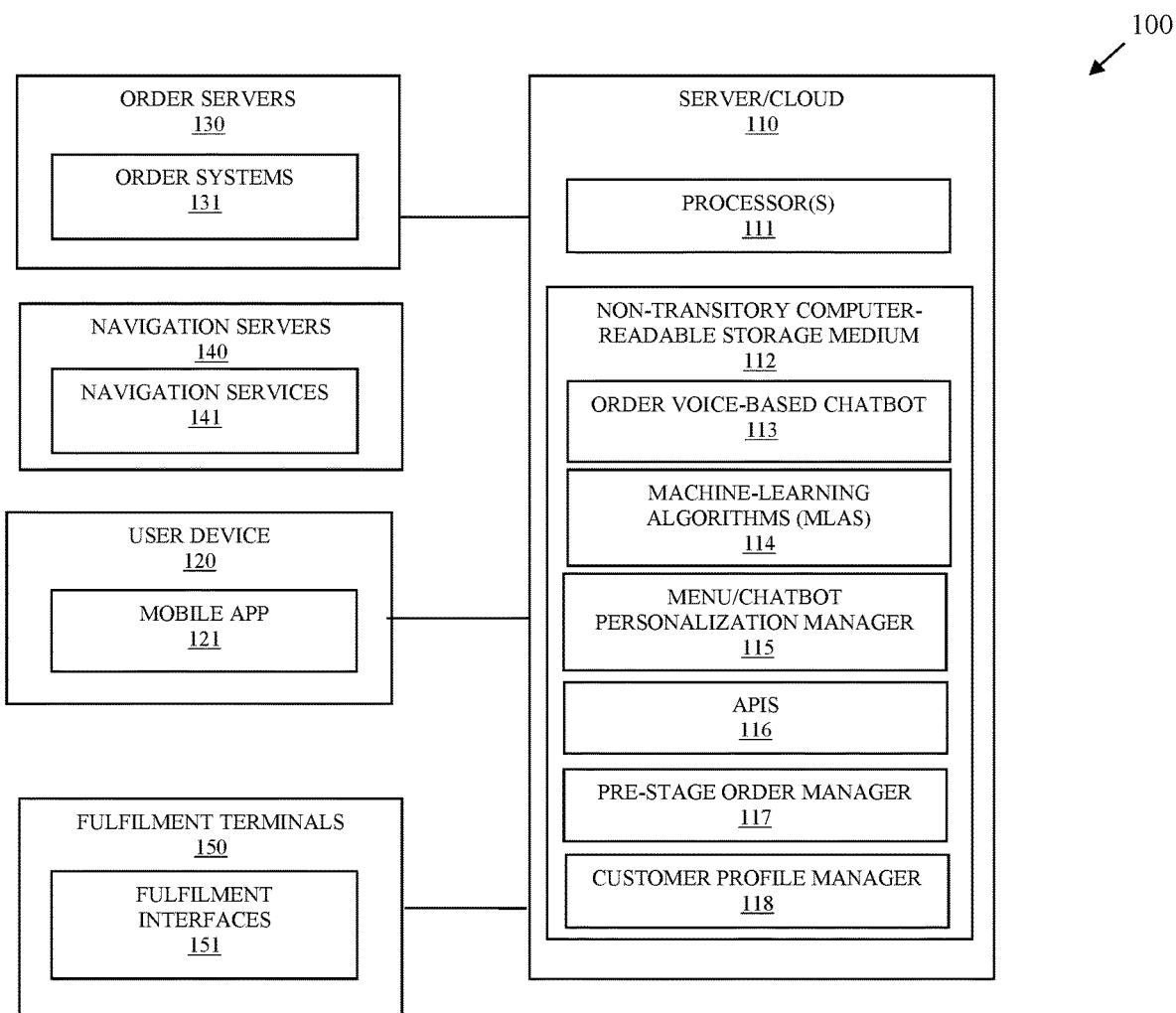
FIG. 1 is a diagram of a system for voice-based menu personalization, according to an example embodiment.

FIG. 1 is a diagram of a system 100 for voice-based menu personalization, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of voice-based menu personalization, presented herein and below.

As used herein and below, the terms "user," "consumer," "user," and "customer" may be used interchangeably and synonymously. The terms refer to an individual placing an order at a transaction terminal.

As will be demonstrated more clearly herein and below, system 100 permits users to use natural-language and hands fee pre-stage ordering, where the voice orders are translated from audio to text and processed via Application Programming Interfaces (APIs) with the corresponding order systems of retailers. Further, when a location of the user is determined to be in-route to a pickup location, order fulfillment terminals are notified to begin preparing the pre-staged order to time the preparedness of the order with the arrival of the user at the pickup location. The system 100 is particular useful to users placing orders while in vehicles and traveling. The system 100 also allows retailers to efficiently process orders and fulfill orders to thereby reduce drive-thru times and increase timely order fulfillment.

Additionally, system 100 is customized for each user for voice recognition and and item ordering. Voice and item menu customization is performed using deep learning and machine learning, such that the speech associated with item menus and ordering commands are customized to specific lexicons associated with the speech, and an individual's voice characteristics and speech patterns are learned for specifically interacting with a given user during a voice ordering session.

A given user's voice characteristics (may also be referred to herein as "voice features") comprise, by way of example only, such things as pitch (degree of highness or lowness with respect to tone), tone (vocal sound, quality, and strength), dialect, volume, rhythm (timing, syllable stress or lack of stress, pattern, etc.), clarity, vocabulary specific to the user, pronunciation, mispronunciation, emphasis, etc.

System 100 includes a server/cloud 110, one or more user devices 120, one or more order servers 130, one or more navigation servers 140, and one or more fulfillment terminals 150.

Server/cloud 110 comprises at least one processor 111 and a non-transitory computer-readable storage medium 112. Medium 112 comprises executable instructions representing an order voice-based chatbot 113, one or more machine-learning algorithms (MLAs) 114, menu/chatbot personalization manager 115, APIs 116, a pre-stage order manager 117, and a customer profile manager 118. Executable instructions when executed by processor 111 from medium 112 cause processor 111 to perform the processing discussed herein and below with respect to 113-118.

User device 120 comprises a processor and a non-transitory computer-readable storage medium. The medium comprising executable instructions for a mobile app (app) 121. The executable instructions when executed by the processor from the medium cause the processor to perform the processing discussed herein and below with respect to app 121.

Each order server 130 comprises at least one processor and non-transitory computer-readable storage medium. The medium comprising executable instructions for an order system 131. The executable instructions when executed by the processor from the medium cause the processor to perform the processing discussed herein and below with respect to order system 131.

Each navigation server 140 comprises at least one processor and non-transitory computer-readable storage medium. The medium comprising executable instructions for a navigation service 141. The executable instructions when executed by the processor from the medium cause the processor to perform the processing discussed herein and below with respect to navigation service 141.

Each fulfillment terminal 150 comprises at least one processor and non-transitory computer-readable storage medium. The medium comprising executable instructions for a fulfillment interface 151. The executable instructions when executed by the processor from the medium cause the processor to perform the processing discussed herein and below with respect to fulfillment interface 151.

During operation of system 100 voice-based pre-staged orders are processed on behalf of users/customers in manners and embodiments that are now discussed with reference to FIG. 1.

Mobile app 121 presents a natural language based front-end user interface to the user and, optionally, a Graphical User Interface (GUI) for touch-based interaction and/or visual-based confirmation of a natural language voice-based session with server/cloud 110. Mobile app 121 when activated on user device 120 establishes a wireless connection to order voice-based chatbot 113. Mobile app 121 may also interact with location services on device 120 to continuously report location information for the device 120 and a device identifier for device 120 to chatbot 113 and/or pre-stage order manager 117.

Once a connection is made between app 121 and chatbot 113, a natural-language voice session is established. Chatbot 113 is configured to receive voice audio spoken by the user into a microphone associated with user device 120 and convert the audio into text comprising actions based on user intentions; the actions to be processed on behalf of the user. Similarly, Chatbot 113 is configured to receive as input text-based information during the natural language voice session from pre-stage order manager 117. The text-based information is translated by chatbot 113 and communicated to the user during the natural language voice-based session and spoken feedback that is played over a speaker associated with user device 120 to the user.

Chatbot 113 utilizes menu/chatbot personalization manager 115 and MLAs 114 for purposes of interacting with the user during a voice session and dialogue. Menu/chatbot personalization manager 115 provides a lexicon of words customized for ordering commands and item menus. The lexicon is provided to chatbot 113 during initiation of the voice session and dialogue for Chatbot to custom configure its voice output and voice recognition to focus on words and commands associated with item ordering from order systems 131.

A registered user when accessing system 100 for a first time may be asked by chatbot 113 to perform a voice training session during which voice features and characteristics for the user are captured.

During an initial voice training session, Chatbot 113 reads and/or displays text sentences and words on a display of device 120 and requests (though speech and/or displayed text instructions) that the user repeat the sentences and words into a microphone associated with user device 120, the speech is returned from app 121 as an audio snippet (the audio snippet may be compressed by app 121 before sending over a wireless network connection to chatbot 113).

The speech customization for the user may occur in a few manners or a combination of manners.

In a first technique, Chatbot 113 provides the audio snippet and the ordering lexicon (item ordering words, terms, commands) as input to an MLA 114 and further provides the text for the word or sentence to the MLA 114 as expected output during a training session. This process is repeated for a preconfigured number of iterations utilizing random selected sentences from the ordering lexicon comprising the item ordering words, terms, and commands. MLA 114 derives a model or an algorithm that when provided the ordering lexicon and an audio snippet from the given user as input produces as output text corresponding to the inputted audio snippet.

In a second technique, separate MLAs 114 are used during the initial user voice training session. Each MLA 114 trained to return a scalar value for each voice feature from any user's audio snippet. Each scalar value for each voice feature is noted for a specific given user. At the end of the user voice training session, the scalar values for a given features may be averaged or retained as a list, and each voice feature along with the averaged scalar value or list of scalar values are maintained in a voice profile linked to a given user's profile by profile manager 118 (a reference or a link to a given users voice profile is retained in that user's profile for access by chatbot 113 during subsequent voice dialogues by chatbot 113). Next, the original users audio snippets used during the voice training session, the ordering lexicon, and the user's voice profile are provided as input to an MLA 114 and the corresponding text for the words or sentences are provided as expected output from the MLA 114 during a training session.

The first technique comprises a trained MLA 114 per user whereas the second technique comprises a series of individual MLAs 114 that are trained to produce a customized voice profile for a user and a given ordering lexicon. An additional MLA is trained to receive as input a specific user's voice profile and a specific order lexicon and produces as output the text associated with spoken sentences and words by that user.

During non training sessions, the voice recognition for a given user engaged in a given voice session and dialogue is translated by chatbot 113 utilizing the first technique or the second technique. An audio snippet for the corresponding non-training session voice dialogue is retained for continuously training of the MLAs 114 during subsequent training sessions. This ensures that both the first technique and the second technique are continuously learning to custom recognize a specific user's voice for specific item menu lexicons (words, terms, and commands).

With the first technique, the voice profile for a given user is implicitly maintained and configured into the continuously trained MLA 114 associated with that specific user. With the second technique, customized trained MLA 114 are trained to return scalar values for a given user and a given voice feature. The scalar values and corresponding features retained in a voice profile that is specific to the user. A non-user specific MLA 114 is then trained to utilize the voice profile of a given user and produce accurate text translation for that user. In the second technique, the given user's voice profile may be continuously updated by providing the subsequent non-training voice snippets for a given user to the MLAs 114 associated with producing the scalar values for the voice features.

Once the first technique or the second technique is configured, the user is ready to engage chatbot 113 for voice-based pre-staged ordering.

A user can initiate a connection and a corresponding session with chatbot 113 in a variety of manners. For example, app 121 may listen for a spoken wake-up word causing the session to be established. In another case, app 121 may establish a session with chatbot 113 based on user activation of a GUI option presented within a user-facing GUI when app 121 is initiated on device 120. In yet another situation, when user initiates app 121 on device 120 a session with chatbot 113 is automatically established by app 121 with chatbot 113 and the app 112 autonomously speaks to the user asking the user how can I help or would you like to place a pre-staged order?

Once the app 121 has a session with chatbot 113, the user can speak in natural language a desired order and/or a desired retailer that the user wants the order pre-staged with to chatbot 113. The user may also ask questions of chatbot 113, such as what places near me or in the direction that I am traveling have Chinese food or have cheese conies? Chatbot 113 determines the intention of the user based on the returned text transaction provided by the MLAs 114 (first or second technique), such as a question about a specific type of food, a specific restaurant, a specific distance to a nearby food establishment, etc. The intention can also be an instruction for a specific order, such as order me a double cheeseburger from McDonalds®.

Chatbot 113 determines actions that need to be processed based on the detected intentions from the user's voice statements during the session. The actions are then processed as operations with pre-stage order manager 117. Results returned by 151 are provided as text input information to chatbot 113. Chatbot 113 then translates the text input information and communicates back to the user through speech as a response to the user's initial question or instruction (based on the determined user intention).

Pre-stage order manager 117 manages all text-based actions determined to be necessary by chatbot 113 during the session with the user. Manager 117 interacts with a corresponding order system 131 an order API 116, a corresponding navigation service 141 using navigation API 116, and a corresponding fulfillment interface 151 using fulfillment API 116. Results of actions are returned by 131, 141, and/or 151 and provided by manager 117 for translation into natural spoken language by chatbot 113 for communication to the user during the session as feedback to the initial user's spoken intention.

Manager 117 also interacts with customer profile manager 118 to obtain a profile for a registered user/customer. The profile may be linked to a user device identifier for user device 120. The profile may include a transaction history for transactions of the user, links to audio snippet histories, a link to a current user voice profile (for the second technique), username, user home address, a payment method (payment card and/or payment service), preferred restaurants, preferred food items, disfavored restaurants, disfavored food items, preferred price point for food purchases, etc.

Reported device location information for device 120 from app 121 permits manager 117 to identify where the user is located and even a direction of travel for the user (based on changing device locations for device 120). Moreover, the difference in time between two reported device locations, permits manager 117 to compute both a direction of travel for device 120 and a rate or travel or speed that device 120 is traveling. This allows manager 117 to know when the user is stationary or when the user is traveling in a vehicle. The user can also be determined to be at a home address (using the profile from profile manager 118) or can be determined to be traveling in the direction of the home address or away from the home address.

Manager 117 uses actions associated intentions directed to questions posed by the user as determined by chatbot 113 to locate specific restaurants or any restaurant that can provide the information to satisfy the request. This is done by manager 117 using the location information, speed of travel, and direction of travel to interact with navigation services 141 using navigation API 116 to obtain the specific restaurants or any restaurant within a predefined distance or within a distance that will be reached within a predefined amount of time (based on speed and direction of travel). The names, distances, and time to reach information can be provided as text input information to chatbot 113. Chatbot 113 translates to speech and communicates to the user via app 121. Additionally, specific menu items and prices for any given restaurant can be obtained by manager 117 using the corresponding order API 116 and interacting with the corresponding order system 131. Again, menu items and prices for the specific restaurants are provided as text input information to chatbot 113. Chatbot 113 translates to speech and communicates to the user via app 121. This interaction between the user (via app 121), chatbot 113, and manager 117 continues during the voice session as a dialogue with the user with the speech of the user being translated to text utilizing the first technique or the second technique as discussed above.

At some point during the dialogue (note this may be at the very beginning of the session), the user speaks an intention to place a specific order with a specific restaurant. Chatbot 113 translates to text utilizing the first technique or the second technique and derives the user intention. Chatbot 113 provides the order details to manager 117. Manager 117 uses an order API 116 for a needed order system 131 and places a pre-staged order for pickup by the user with the corresponding restaurant using the order details. The order details may include a payment card, or a payment service obtained by manager 117 from a profile of the user via profile manager 118. The order details may also include an estimated or expected pickup time. Manager 117 may calculate the estimated pickup time based on the direction of travel and speed associated with the location data for device 120; alternatively, during the dialogue the user may have communicated the expected pickup time (the user may want to go somewhere else first or get gas for their vehicle before heading to pickup the order.

Manager 117 continues to monitor the order estimated and expected pickup time and location data of device 120 once the order is placed on behalf of the customer. When manager 117 determines that the food preparation time (based on historical data or data provided by the restaurant for orders) will be completed and substantially coincide with the arrival time of the user (based on the location data), manager 117 uses a fulfillment terminal API 116 and sends a message to the corresponding restaurant's fulfillment interface 151 with the order number and an instruction to begin food preparation of the order now as the user/customer is expected to arrive within X minutes. Manager 117 may also send a message to chatbot 113 to communicate to the user that the order is being prepared for pickup by the restaurant along with any pickup location details provided by fulfillment interface to manager 117 during their interaction. For example, the restaurant may have instructions to pickup the order in a predesignated area of its packing lot, which is not associated with any drive-thru and which is not associated with the user leaving the car to come into the restaurant. This allows the restaurant to manage pre-staged orders for pickup separately from its drive-thru customers and separate from customers dining in the restaurant (assuming this is even permitted during COVID19).

An example, process flow utilizing the voice-based pre-staged transaction processing of system 100 may proceed as follows. It is noted that this example process flow is intended to be illustrative and non-limiting as a variety of other voice sessions and voice dialogues associated with other process flows are foreseeable by system 100.

A user engages chatbot 113 for a first time to perform a voice training session as discussed above and system 100 is customized for the voice of the specific user and for the lexicon associated with item menus and item ordering commands.

Subsequent to the voice training session, a consumer/user initiates the voice interaction within their vehicle utilizing user device 120 and app 121 to create a voice session with chatbot 113 associated with a voice dialogue with the consumer. It is to be noted, that this connection may have already been established and continues following the voice training session; e.g., the user engages chatbot 113 in a same connection immediately following the voice training session for placing a pre-staged order.

The consumer requests a food or restaurant choice they are interested in from the chatbot 113. Chatbot 113 utilizes MLAs 114 for speech transaction to text using the first technique or the second technique, derives an intention, identifies actions, and interacts with manager 117. Manager 117 analyzes the text actions translated by chatbot 113 for the request, analyzes location data returned by app 121 for the request, and interacts with navigation service 141 using API 116 and order systems 131 using API 116. Manager 117 determines specific menu items satisfy the request from a specific restaurant and provides a text feedback information to chatbot 113. Chatbot 113 translates the menu items to speech and communicates to the consumer via app 121 during the session and dialogue. The consumer responds with specific options via voice to chatbot 113. Chatbot 113 provides the options as translated text input information to manager 117 after utilizing the first or the second technique as discussed above. The options are communicated to the proper order system 131 as a pre-staged consumer order by manager 117 and confirmed. The confirmation is sent from manager 117 to chatbot 113 and communicated to the consumer during the voice session and dialogue. Payment information may also be provided by manager 117 for the pre-staged consumer order to order system 131 based on the consumer's profile or based on specific voice-based payment card information provided by the consumer to chatbot 113 during the voice session and voice dialogue.

Manager 117 continues to monitor location data for device 120 and the corresponding pre-staged consumer order. When manager 117 determines that the device 120 is within a predefined range or time for arriving at the restaurant, manager 117 sends a message to the appropriate fulfillment interface 151 stating the order should be prepared now. Any pickup instructions are provided from interface 151 to manager 117, manager 117 communicates to chatbot 113, and chatbot 113 provides the pickup instructions to the consumer as voice during the voice session and voice dialogue. The consumer drives on site and picks up food from the appropriate drive thru area for pre-staged orders or other area defined by the pickup instructions.

Manager 117 detects from the location data of device 120 that the consumer has arrived at the restaurant and sends another message to fulfillment interface 151 informing staff that the consumer associated with the order is onsite for pickup of the order.

In an embodiment, user device 120 is a phone, a tablet, a laptop, a built-in vehicle computing device, or a wearable processing device.

In an embodiment, the fulfilment terminal is a backend kitchen-based ordering terminal or monitor used by staff to prepare orders within a given restaurant.

In an embodiment, system 100 is processed for pre-staging an order for pickup that is not associated with food take out, such a groceries, or non-food products.

In an embodiment, app 121 maintains any voice profile generated during training sessions for the second technique. Here, each time a user's voice profile is updated during a training session, manager 117 pushes the voice profile to app 121 and when app 121 establishes a connection with chatbot 113, app 121 provides the user's voice profile. In this way, a user may remain anonymous and identifiable only through device identifier for device 120 and the user's voice profile is never retained by server/cloud 110; this provides privacy protection to those users that are uncomfortable with private and personal information about the user being maintained by server/cloud 110. Here, any profile maintained by profile manager 118 may be devoid of personal information for the user and maintained based on device identifier. The personal information, not present in the corresponding device profile, may include user name, user home address, user email, voice profile (since it retained on device 120 by app 121), or any other identifying or private information that the user does not authorize server/cloud 110 to retain.

In an embodiment, chatbot 113 is configured to use a spoken language and dialect associated with the user. In an embodiment, during voice training, chatbot 113 detects the user's spoken language and dialect. In an embodiment, the profile for the user includes spoken language identifiers and dialect identifiers.

In an embodiment, app 121 presents on a display associated with device 120 a visual representation of chatbot 113 during the voice dialogue, such as an animation or an avatar.

In an embodiment, app 121 is provided as a stand-alone mobile device app, a vehicle system-based app, a browser-based app, or an app integrated into a social media system (Facebook®, Instagram®, Twitter®, etc.).

In an embodiment, device 120 is a wearable processing device, a phone, a laptop, a desktop, a device integrated into an electric car or non-electric car, or any intelligent application associated with an Internet-of-Things (IoT) device.

In an embodiment, 113-118 is provided as an enhancement to an existing voice-bases service, such as Amazon® Echo®, Google® Home®, Apple® Siri®, etc.

These and other embodiments will now be discussed with reference to FIGS. 2-3.

Figure 2:
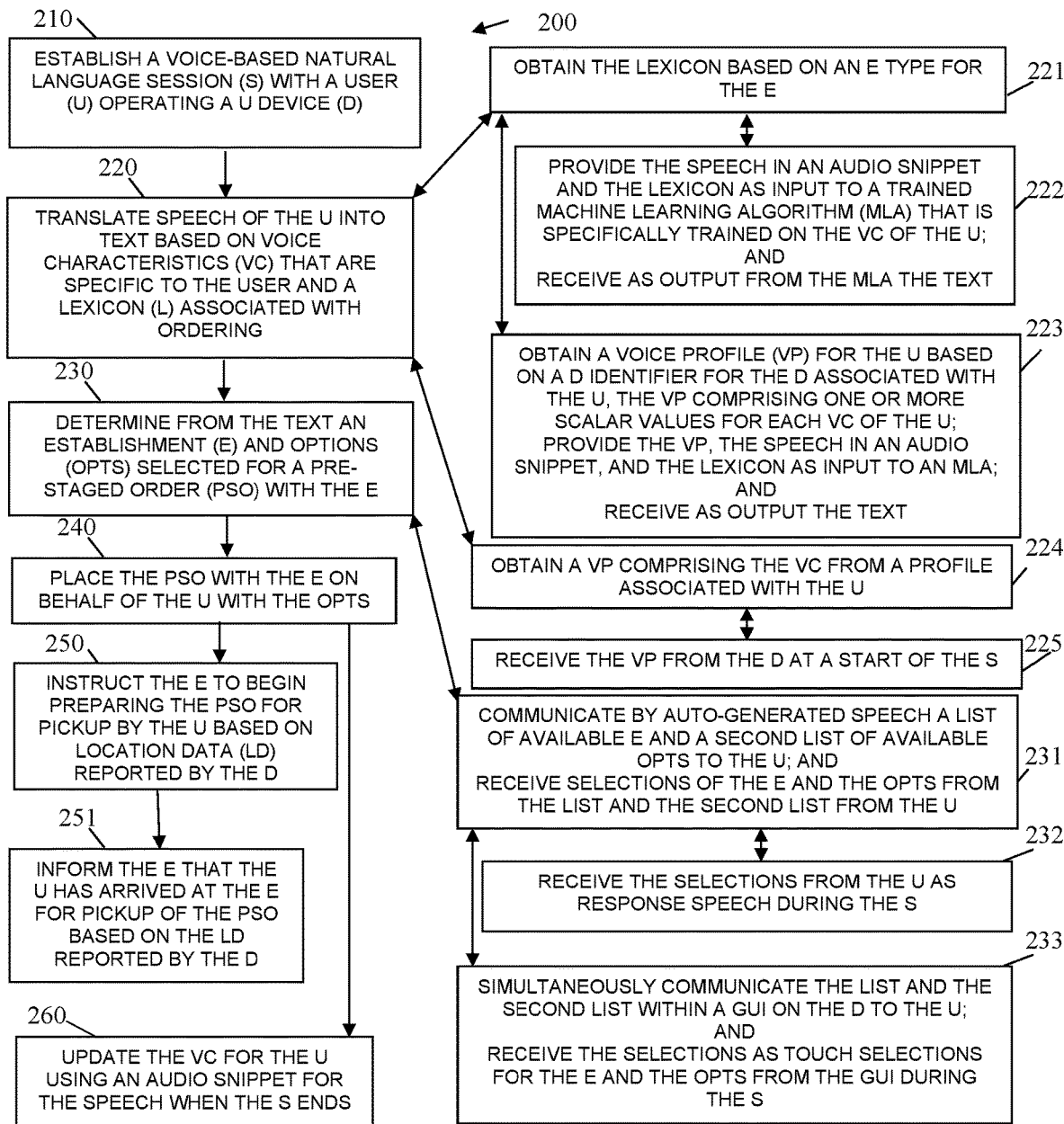
FIG. 2 is a diagram of a method for voice-based menu personalization, according to an example embodiment.

FIG. 2 is a diagram of a method 200 for voice-based menu personalization, according to an example embodiment. The software module(s) that implements the method 200 is referred to as a "personalized voice ordering chatbot." The personalized voice ordering chatbot is implemented as executable instructions programmed and residing within memory and/or a non-transitory computer-readable (processor-readable) storage medium and executed by one or more processors of a device. The processor(s) of the device that executes the personalized voice ordering chatbot are specifically configured and programmed to process the personalized voice ordering chatbot. The personalized voice ordering chatbot may have access to one or more network connections during its processing. The network connections can be wired, wireless, or a combination of wired and wireless.

In an embodiment, the device that executes the personalized voice ordering chatbot is server 110. In an embodiment, the server 110 is a cloud-based processing environment comprising a collection of physical servers cooperating as a single logical server (a cloud 110).

In an embodiment, the personalized voice ordering chatbot is all or some combination of the chatbot 113, MLAs 114, menu/chatbot personalization manager 115, APIs 116, pre-stage order manager 117, and/or customer profile manager 118.

At 210, the personalized voice ordering chatbot establishes a voice-based natural language session with a user operating a device. The device can be a phone, a computing device integrated into a vehicle, a wearable processing device, a tablet, a laptop, or a voice-enabled appliance (such as Amazon® Alexa®, Google® Home®, Apple® Siri®, etc.).

At 220, the personalized voice ordering chatbot translates the user's speech into text based on voice characteristics that are specific to the user and a lexicon associated with ordering (item menu terms, menu ordering commands, etc.).

In an embodiment, at 221, the personalized voice ordering chatbot obtains the lexicon based on an enterprise type for the enterprise. The type may be a specific type of restaurant (such as fast food, pizza, Italian, Chinese, etc. or a specific restaurant chain, e.g., Red Lobster®, etc.).

In an embodiment of 221 and at 222, the personalized voice ordering chatbot provides the speech in an audio snippet and the lexicon as input to a trained machine-learning algorithm that is specifically trained on the voice characteristics of the user. In response, the personalized voice ordering chatbot receives as output from the trained machine-learning algorithm the text representation of the user's speech.

In an embodiment of 221 and at 223, the personalized voice ordering chatbot obtains a voice profile for the user based on a device identifier for the user device associated with the user. The voice profile comprises one or more scalar values for each voice characteristic of the user. The personalized voice ordering chatbot provides the voice profile, the speech in an audio snippet, and the lexicon as input to a trained machine-learning algorithm. In response, the personalized voice ordering chatbot receives as output from the trained machine-learning algorithm the text representation of the user's speech.

In an embodiment, at 224, the personalized voice ordering chatbot obtains the voice profile from a profile associated with the user. The voice profile comprises the voice characteristics.

In an embodiment of 224 and at 225, the personalized voice ordering chatbot receives the voice profile from the user device at a start of the natural language session. Here, the user desires to maintain anonymity such that personal information of the user is not retained by personalized voice ordering chatbot and for each session the user device provides the voice profile of the user to the personalized voice ordering chatbot.

At 230, the personalized voice ordering chatbot determines from the text an establishment and options selected for a pre-staged order with the establishment.

In an embodiment, at 231, the personalized voice ordering chatbot communicates by auto-generated speech a list of available establishments and a second list of available options to the user. The personalized voice ordering chatbot receives selections of the establishment and the options from the list and the second list from the user.

In an embodiment of 231 and at 232, the personalized voice ordering chatbot receives the selections from the user as response speech during the session.

In an embodiment of 231 and at 233, the personalized voice ordering chatbot simultaneously communicates the list and the second list within a GUI on the user device to the user. The personalized voice ordering chatbot receives the selections as touch selections for the enterprise and the options from the GUI during the session.

At 240, the personalized voice ordering chatbot places the pre-staged order with the enterprise on behalf of the user with the options.

In an embodiment, at 250, the personalized voice ordering chatbot instructs the enterprise to begin preparing the pre-staged order for pickup by the user based on location data reported by the user device.

In an embodiment of 250 and at 251, the personalized voice ordering chatbot informs the enterprise that the user has arrived at the establishment for pickup of the pre-staged order based on the location data reported by the user device.

In an embodiment, at 260, the personalized voice ordering chatbot updates the voice characteristics for the user using an audio snippet for the speech when the session ends.

Figure 3:
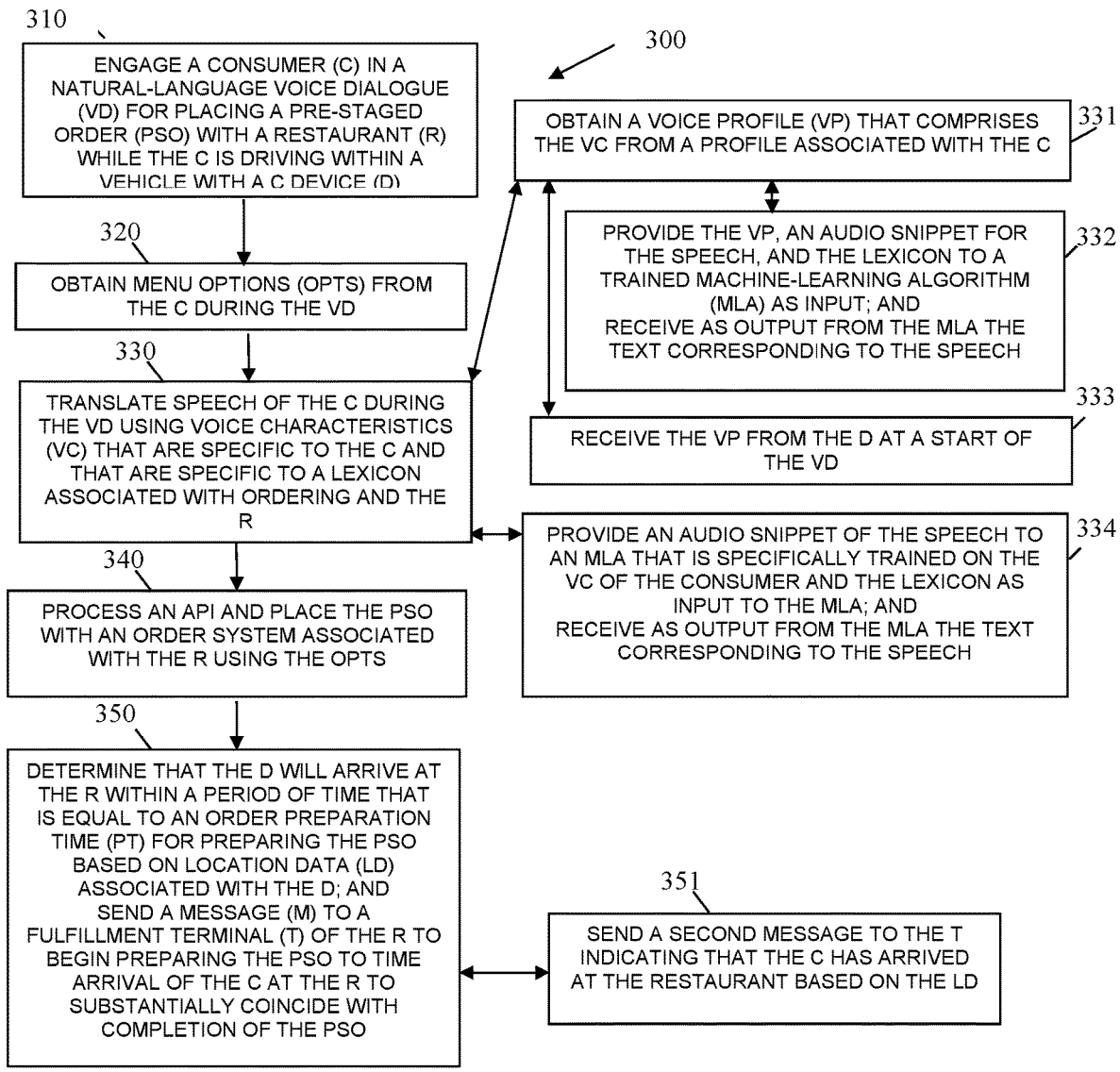
FIG. 3 is a diagram of another method for voice-based menu personalization, according to an example embodiment.

FIG. 3 is a diagram of another method 300 for voice-based menu personalization according to an example embodiment. The software module(s) that implements the method 300 is referred to as a "personalized menu and speech ordering manager." The personalized menu and speech ordering manager is implemented as executable instructions programmed and residing within memory and/or a non-transitory computer-readable (processor-readable) storage medium and executed by one or more processors of a device. The processors that execute the personalized menu and speech ordering manager are specifically configured and programmed to process the personalized menu and speech ordering manager. The personalized menu and speech ordering manager may have access to one or more network connections during its processing. The network connections can be wired, wireless, or a combination of wired and wireless.

In an embodiment, the device that execute the personalized menu and speech ordering manager is server 110. In an embodiment, the server 110 is a cloud processing environment (cloud 110).

In an embodiment, the personalized menu and speech ordering manager is all of, or some combination of: chatbot 113, MLAs 114, menu/chatbot personalization manager 115, APIs 116, pre-stage order manager 117, customer profile manager 118, and/or the method 300.

The personalized menu and speech ordering manager presents another and, in some ways, enhanced processing perspective of the method 200.

At 310, the personalized menu and speech ordering manager engages a consumer in a natural-language voice dialogue (dialogue) for placing a pre-staged order with a restaurant while the consumer is driving within a vehicle with the consumer device.

At 320, the personalized menu and speech ordering manager obtains menu options from the consumer during the voice dialogue.

At 330, the personalized menu and speech ordering manager translates speech of the consumer during the voice dialogue using voice characteristics that are specific to the consumer and that are specific to a lexicon associated with ordering and the restaurant.

In an embodiment, at 331, the personalized menu and speech ordering manager obtains a voice profile that comprises the voice characteristics from a profile associated with the consumer.

In an embodiment of 331 and at 332, the personalized menu and speech ordering manager provides the voice profile, an audio snippet for the speech, and the lexicon to a trained machine-learning algorithm as input. In response, the personalized menu and speech ordering manager receives as output from the trained machine-learning algorithm the text that corresponds to the consumer's speech.

In an embodiment of 331 and at 333, the personalized menu and speech ordering manager receives the voice profile from the consumer device.

In an embodiment, at 334, the personalized menu and speech ordering manager provides an audio snippet of the speech to a trained machine-learning algorithm that is specifically trained on the voice characteristics of the consumer and the lexicon is provided to the trained machine-learning algorithm as input. In response, the personalized menu and speech ordering manager receives as output from the trained machine-learning algorithm the text that corresponds to the consumer's speech.

At 340, the personalized menu and speech ordering manager processes an API and places the pre-staged order with an order system associated with the restaurant using the options.

In an embodiment, at 350, the personalized menu and speech ordering manager determines that the consumer device will arrive at the restaurant within a period of time that is equal to an order preparation time for preparing the pre-staged order based on location data associated with and reported by the consumer device. The personalized menu and speech ordering manager sends a message to a fulfillment terminal of the restaurant to begin preparing the pre-staged order in order to time arrival of the consumer at the restaurant to substantially coincide with completion of the pre-staged order by the restaurant staff.

In an embodiment of 350 and at 351, the personalized menu and speech ordering manager sends a second message to the fulfillment terminal indicating that the consumer has arrived at the restaurant based on the location data being reported by the consumer device.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   engaging a consumer in a natural language voice dialogue to place an order at an establishment using voice characteristics specific to the consumer and a lexicon specific to ordering with the establishment;
   translating speech of the consumer into text based on the voice characteristics that are specific to the consumer and the lexicon associated with ordering, wherein the translating utilizes a machine learning algorithm that receives as input the voice characteristics, an audio snippet of consumer speech, and the lexicon, and provides as output the text that corresponds to the speech;
   customizing voice interaction using deep learning techniques by performing an initial voice training session to capture voice features and characteristics for the consumer;
   wherein during the initial voice training session:
   displaying text sentences on a display device;
   receiving audio snippets of the speech from the consumer in response to prompts to the consumer to repeat the text sentences; and
   training the machine learning algorithm to return voice features of the consumer, wherein corresponding features are retained in a voice profile specific to the consumer; and
   training a non-user specific machine learning algorithm to utilize the voice profile to enable text translation for the consumer;
   placing the order within an order system associated with the establishment using menu options obtained from the consumer during the engaging; and
   sending a message to a fulfillment terminal of the establishment to begin order preparation when location data associated with a consumer device of the consumer indicates that the consumer is in route to the establishment to pick up the order and a calculated time in which the consumer is estimated to arrive at the establishment, wherein the calculated time corresponds with an order preparation time for the establishment to complete the order.

2. The method of claim 1 further comprising, sending a second message to the fulfillment terminal when the location data indicates the consumer has arrived at the establishment.

3. The method of claim 1, wherein engaging further includes obtaining a voice profile for the consumer and identifying the voice characteristics from the voice profile.

4. The method of claim 3, wherein engaging further includes obtaining the audio snippet from the voice profile.

5. The method of claim 4, wherein engaging further includes obtaining the lexicon based on an establishment identifier associated with the establishment.

6. The method of claim 1 further comprising, updating the voice characteristics of the consumer based on the speech provided by the consumer during the engaging.

7. The method of claim 1, wherein engaging further includes identifying the consumer based on a device identifier for a consumer device, wherein the speech of the consumer during the engaging is provided through a microphone of the consumer device.

8. The method of claim 7, wherein engaging further includes obtaining the voice characteristics for the consumer from the consumer device.

9. The method of claim 1, wherein engaging further includes communicating auto-generated speech at a start of the engaging to the consumer through a speaker of a consumer device, wherein the auto-generated speech communicates a list of available establishments.

10. The method of claim 9, wherein engaging further includes identifying the establishment based on speech of the consumer responsive to the communicating of the auto-generated speech.

* * * * *